United States Patent
Romero et al.

(10) Patent No.: US 9,281,869 B2
(45) Date of Patent: Mar. 8, 2016

(54) NETWORK REPEATER

(71) Applicant: Broadcom Networks Spain, S.L., Barcelona (ES)

(72) Inventors: Veronica Romero, Barcelona (ES); David Ruiz Lopez, Barcelona (ES)

(73) Assignee: BROADCOM NETWORKS SPAIN, S.L., Barcelona (ES)

( * ) Notice: Subject to any disclaimer, the term of this patent is extended or adjusted under 35 U.S.C. 154(b) by 349 days.

(21) Appl. No.: 13/902,283

(22) Filed: May 24, 2013

(65) Prior Publication Data

US 2013/0259096 A1  Oct. 3, 2013

Related U.S. Application Data

(63) Continuation of application No. 12/874,404, filed on Sep. 2, 2010, now Pat. No. 8,571,046, which is a continuation of application No. 11/562,380, filed on Nov. 21, 2006, now Pat. No. 7,808,985.

(51) Int. Cl.
*H04L 12/28* (2006.01)
*H04B 3/58* (2006.01)
*H04L 12/46* (2006.01)

(52) U.S. Cl.
CPC . *H04B 3/58* (2013.01); *H04L 12/46* (2013.01)

(58) Field of Classification Search
None
See application file for complete search history.

(56) References Cited

U.S. PATENT DOCUMENTS

| | | | |
|---|---|---|---|
| 7,697,450 B2 * | 4/2010 | D'Amico et al. | 370/252 |
| 2005/0168326 A1 | 8/2005 | White, II et al. | |
| 2005/0232281 A1 * | 10/2005 | Rosenzweig et al. | 370/400 |
| 2006/0097573 A1 | 5/2006 | Gidge et al. | |
| 2006/0220833 A1 | 10/2006 | Berkman | |
| 2006/0245428 A1 * | 11/2006 | Yanamoto et al. | 370/394 |

OTHER PUBLICATIONS

European Patent Office; European Search Report; EP Application No. 07862182.8; Apr. 23, 2014; 7 pgs.

* cited by examiner

*Primary Examiner* — Minh-Trang Nguyen
(74) *Attorney, Agent, or Firm* — Garlick & Markison; Edward Marshall

(57) ABSTRACT

A network repeater is configured to repeat data packets in a broadcast mode without generating a significant broadcast storm. The network repeater is configured to detect a characteristic of a received data packet. The data packet characteristic is compared with valid copies of packet characteristics previously stored in a packet registry. During a delay period, if a valid copy of the detected characteristic is found in the packet registry, then it is assumed that the packet is being received for the second time and the data packet is not repeated in the broadcast mode. If a valid copy of the detected characteristic of the data packet is not found in the packet registry, then the characteristic is stored in the packet registry and the data packet is repeated in a broadcast mode.

20 Claims, 3 Drawing Sheets

NETWORK REPEATER

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 12/874,404 entitled, "Network Repeater" filed Sep. 2, 2010, pending, which claims priority pursuant to 35 U.S.C. §120 as a continuation, to the following U.S. Utility Patent Application which is hereby incorporated by reference in its entirety and made part of the present U.S. Utility Patent Application for all purposes:
   a. U.S. Utility application Ser. No. 11/562,380 entitled, "Network Repeater" filed Nov. 21, 2006, issued on Oct. 5, 2010 as U.S. Pat. No. 7,808,985.

BACKGROUND

1. Field of the Invention

The invention is in the field of communications and more specifically in the field of signal repeaters.

2. Related Art

When signals are communicated over distances greater than the communication range of a single transmitter, the signal must often be relayed before being received at its intended destination. This strengthening may be performed by a repeater that receives the signal and promptly resends an amplified copy of the signal.

One problem with repeaters is that they are difficult to use when a signal is broadcast in networks that are not linearly structured. For example, if a network is in the form of a mesh or a ring, a repeater may itself receive a signal that it previously sent. This signal may thus be repeated indefinitely. In mesh networks including more than one repeater, copies of a signal may multiply when each signal sent by one repeater is received and rebroadcast by more than one repeater. This multiplication is referred to as a broadcast storm and may overwhelm a network.

Some systems have tried to avoid broadcast storms by ensuring that the network does not contain any loops. As such, these networks use a unicast or multicast algorithm such as the Spanning Tree Algorithm to transmit the signal to each of the nodes. In a unicast channel, a packet is transmitted to a particular destination, and other nodes in the vicinity do not decode the packet. However, this approach prevents the use of a broadcast channel in a network, and, therefore, may not be practical under some network standards.

Powerline communication networks are one example of mesh networks in which a broadcast storm could occur if repeaters were used. To avoid broadcast storms, repeaters are not used in powerline communications standards, such as the HomePlug AV standard. There is, therefore, a need for improved methods of avoiding broadcast storms, particularly in powerline communication networks.

SUMMARY

A network repeater is configured to repeat data packets without generating a significant broadcast storm. In general, the network repeater repeats all received traffic. This repetition may be in a broadcast channel or a unicast channel. In some embodiments, the network repeater only broadcasts packets received from the broadcast channel. The network repeater is configured to detect a characteristic of a received data packet. The detected characteristic is then compared to valid copies of packet characteristics previously stored in a packet registry. During a limited period, if a valid copy of the detected characteristic is found in the packet registry, then it is assumed that the packet is being received for the second time and the data packet is not repeated in the broadcast mode. If a valid copy of the detected characteristic of the data packet is not found in the packet registry, then the characteristic is stored in the packet registry and the data packet is repeated in a broadcast mode.

Through this approach, the network repeater can distinguish data packets that are received more than once during a particular period of time from those which are received only once. Those packets that are received more than once are not forwarded in a broadcast mode. This prevents the progression of a broadcast storm.

The network repeater is optionally configured to operate on powerline networks, including those structured in a mesh architecture. As such, the network repeater may be configured to both send and receive broadcast data packets through a power receptacle. Network nodes and other repeaters connected to the powerline, within transmission range, will receive data packets broadcast by the network repeater. The network repeater is optionally configured to operate within one or more powerline communication standards.

Various embodiments of the invention include a repeater for powerline communications, a communication network comprising a repeater, a repeater for Ethernet communications, and a method for determining whether to repeat a received data packet. The network adapter is optionally configured to operate according to IEEE 802.3 communication standards.

Various embodiments include a repeater comprising an input/output configured to receive and transmit data packets over a powerline, a packet registry configured to store a valid copy of a characteristic a preceding data packet, a registry manager configured to maintain the valid copy of the characteristic the preceding data packet, logic configured to detect a characteristic of a received data packet, to determine whether the valid copy of the characteristic of the preceding data packet stored in the packet registry matches the characteristic of the received data packet, and to not repeat the received data packet if the valid copy of the characteristic of the preceding data packets matches the characteristic of the received data packet, and a circuit configured to execute the logic.

Various embodiments include a communication network comprising a plurality of nodes configured to communicate data packets over a powerline, and at least one repeater configured to receive a first data packet over the powerline and to repeat the first data packet over the powerline.

Various embodiments include a repeater comprising an input/output configured to receive a data packet using an IEEE 802.3 standard, a packet registry configured to store a valid copy of a characteristic of a preceding data packet, a registry manager configured to maintain the valid copy in the packet registry, logic configured to detect the characteristic of a received data packet, to determine if the valid copy stored in the packet registry matches the characteristic of the received data packet, and to not repeat the received data packet if the valid copy matches the characteristic of the received data packet, and a circuit configured to execute the logic.

Various embodiments include a method comprising receiving a data packet over a powerline, detecting a characteristic of the received data packet, searching a packet registry for a valid copy of the detected characteristic, if the valid copy of the detected characteristic is not found in the packet registry, repeating the received data packet, and establishing the valid copy of the detected characteristic in the packet registry.

Various embodiments comprise a repeater comprising an input/output interface, a packet registry, and logic. In these embodiments, the logic is configured to receive data packets from the input/output interface and repeat the data packets back out through the input/output interface, and to not repeat a received data packet that is a copy of a previously received data packet, when the copy is received within a predetermined time measured from the time of receipt of the previously received data packet. In various embodiments the logic is configured to repeat the received packets in a broadcast mode. In various embodiments, the logic is further configured to identify the received data packet as the copy of the previously received data packet by matching a characteristic of the received data packet to the same characteristic stored in the packet registry. In various embodiments the logic is further configured to store a characteristic of a received data packet in the packet registry if the characteristic of the received data packet does not match any characteristic stored in the packet registry. Optionally, the input/output interface comprises two communication interfaces, each communication interface being configured for a different type of communication network, such as an Ethernet network and a powerline communication network or a wireless network and a powerline communication network. The wireless network may comprise a WiFi network, in some instances. In various embodiments the repeater further comprises a registry manager configured to maintain stored characteristics of received data packets in the packet registry each for the predetermined time.

Various embodiments include a method comprising receiving a first data packet from a first communication network at a first time, determining a characteristic of the first data packet, determining that the characteristic of the first data packet does not match any valid characteristic stored in a packet registry, and storing the characteristic of the first data packet in the packet registry and repeating the first data packet over a second communication network. The method further comprises receiving a second data packet at a second time after the first time and within a predetermined time of the first time, determining a characteristic of the second data packet, matching the characteristic of the second data packet to the characteristic of the first data packet, and then discarding the second packet. Optionally, the first communication network comprises a powerline network and the second communication network comprises a WiFi network. Optionally, repeating the first data packet over the second communication network comprises broadcasting the first data packet to more than one network node. Optionally, the first communication network and the second communication network are the same communication network. Optionally, the predetermined time is less than a retry or retransmission time associated with one or more nodes on the first network.

In various embodiments the method further comprises receiving a third data packet at a third time after the first time and within a predetermined time of the first time, determining a characteristic of the third data packet, determining that the characteristic of the third data packet does not match any valid characteristic stored in the packet registry, and storing the characteristic of the third data packet in the packet registry and repeating the third data packet over the second communication network. In various embodiments the method further comprises marking the characteristic of the first data packet in the packet registry as invalid after the predetermined period of time has elapsed from the receipt of the first data packet.

DETAILED DESCRIPTION

A network includes one or more repeaters configured to operate in a unicast and/or a broadcast mode. Broadcast storms are substantially avoided by using repeaters configured to track whether a data packet is received more than once during a limited time period. Data packets, or other signals, received more than once are not repeated in the broadcast mode. The receipt of a data packet is registered by detecting and storing a valid copy of a characteristic of the data packet at the repeater. This characteristic may include, for example, a source MAC (Media Access Control) address, a checksum, a packet length (e.g., size in bytes), a tag added by logic associated with a repeater, CRC bytes, random bytes within the broadcast frame, and/or the like. The repeater may add a tag or other label to the data packet. The valid copy of the data packet characteristic is stored in a packet registry for a time that is long enough to detect a repeated transmission of a particular packet by one or more repeaters, but short enough to avoid disruption of packets that are legitimately rebroadcast from their source.

Figure 1:
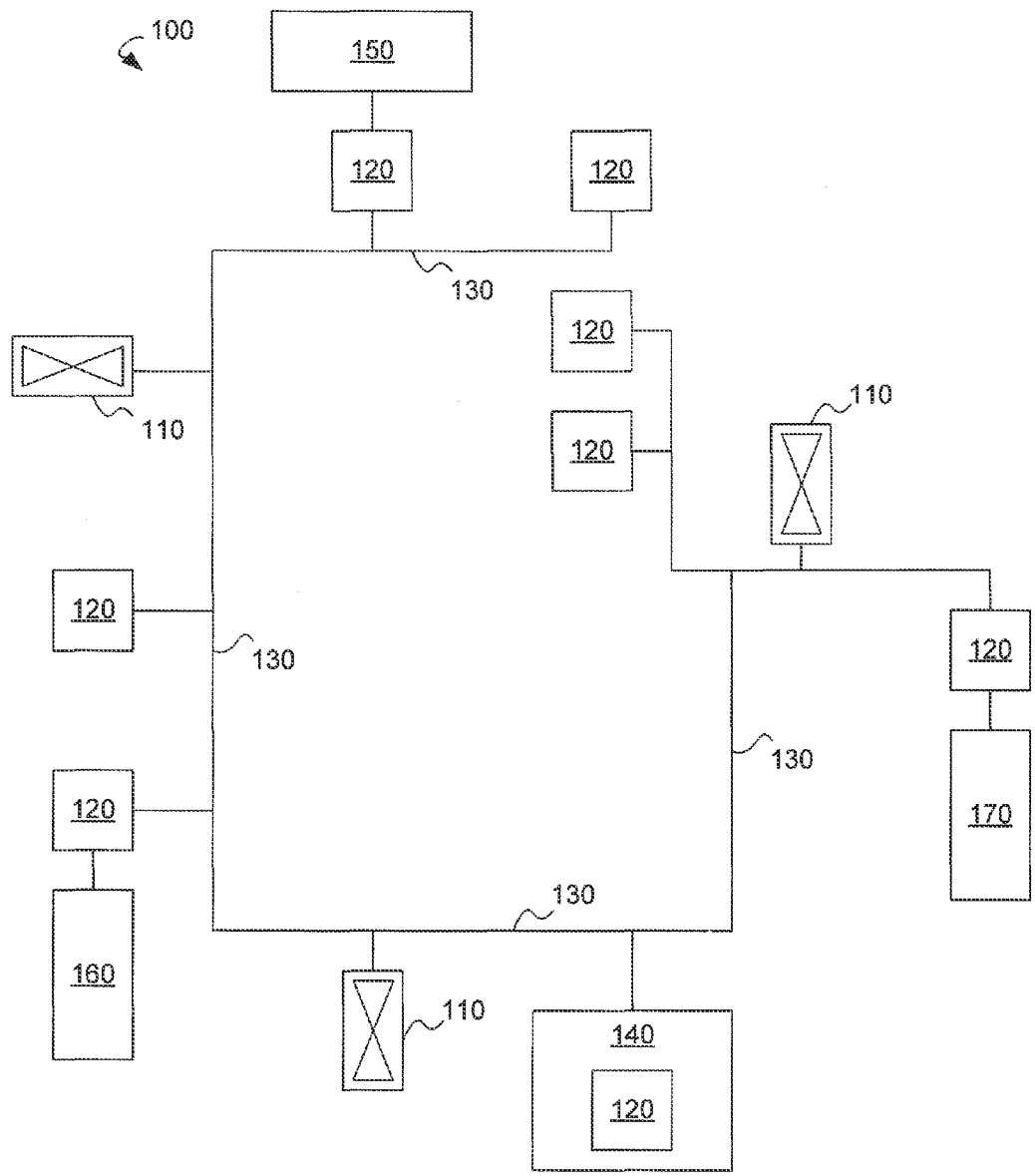
FIG. 1 illustrates various embodiments of a network including one or more repeaters.

FIG. 1 illustrates various embodiments of a network, generally designated 100, and including one or more repeaters 110. Network 100 is optionally a powerline network. However, while a powerline network is discussed herein for the purposes of example, various embodiments may be adapted to other types of networks such as Ethernet networks (IEEE 802.3), hybrid networks, wireless (WiFi) networks, and/or the like. A powerline network is a network in which data is communicated over the same electrical conductors as electrical power. A powerline network optionally comprises a broadcast channel. Network 100 optionally includes a hybrid network, e.g., a network that comprises variety of transmission types such as a powerline network and a wireless network.

Network 100 further includes one or more nodes 120, and a powerline 130 or other communications channel. Powerline 130 may comprise a residential powerline. Nodes 120 are typically connected to powerline 130 through a receptacle (e.g., power outlet configured to receive a plug). The nodes 120 may be included in or connected to network compatible devices. For example, one of the nodes 120 may be included in a stereo receiver 140, one of the nodes 120 may be disposed between powerline 130 and a compact disk player 150, one of the nodes 120 may be disposed between powerline 130 and a server 160, and one of the nodes 120 may be included in a wireless router 170.

Communication between some of the nodes 120 may require that packets be repeated (e.g., relayed) using at least one repeater 110. This repetition may be in either broadcast or unicast modes. For example, a communication sent between compact disk player 150 and stereo receiver 140 may be forwarded using two repeaters 110. A first repeater 110 is configured to receive a data packet and repeat the data packet to one or more nodes 120 and/or one or more other repeaters 110. The second repeater 110 may receive the data packet from the first repeater 110 and again repeat the data packet. The data packet repeated by the second repeater 110 may be received by the first repeater 110. In the prior art, this may result in a loop in which the data packet is indefinitely repeated.

The network 100 may comprise a hybrid network that includes powerline communications and at least one other type of communications such as Ethernet, WiFi, and/or the like. In these embodiments, a signal may be conveyed using several different types of communications. These communications types may be coupled to each other using a network device, such as wireless router 170, a node 120 or a repeater 110, configured to use one or more of these communication types. For example, wireless router 170 may be configured to communicate via powerline communications and over a WiFi network. In some embodiments, the powerline network may act as a bridge between Ethernet networks. If a broadcast packet is received from the Ethernet network, the powerline network broadcasts the packet via a broadcast channel or unicasts the packet to the nodes on the powerline network.

Figure 2:
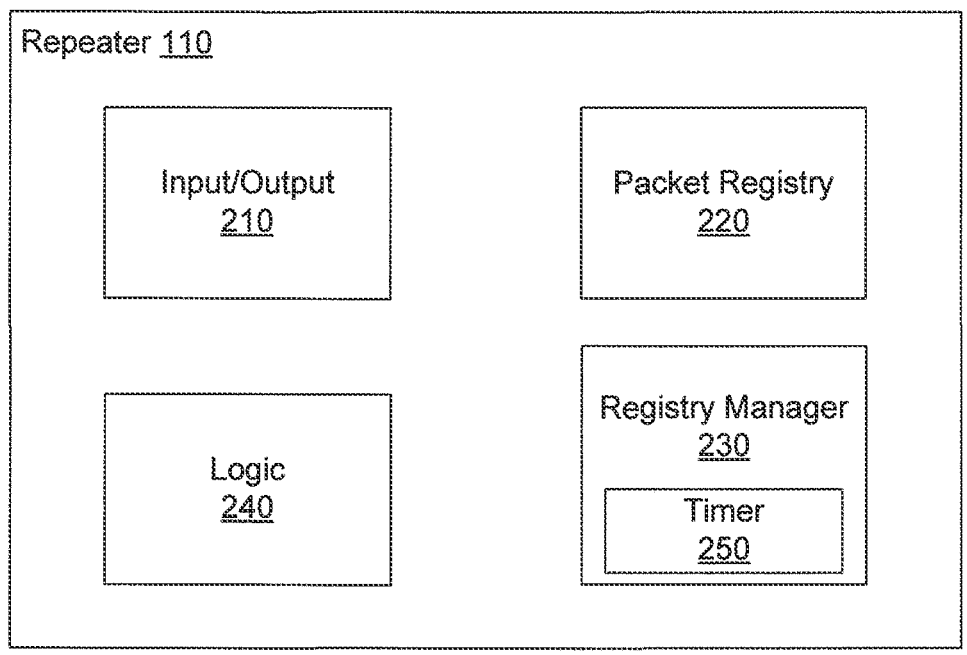
FIG. 2 illustrates various embodiments of a repeater.

FIG. 2 illustrates various embodiments of repeater 110. The repeater 110 may comprise an input/output 210, a packet registry 220, a registry manager 230, and logic 240. These components may be embodied in hardware, firmware and/or software stored on a computer readable medium. For example, in various embodiments, logic 240 includes computing instruction and digital circuits such as a processor, a data bus, data registers, instruction execution circuits, and/or the like. Repeater 110 may be a standalone device, part of an interface (e.g., an audio device to powerline network interface, or a Ethernet to powerline network interface), part of a personal computer, part of a portable computing device, part of a server, and/or the like.

The input/output 210 comprises a communication interface for receiving and transmitting signals over a network such as network 100. These signals typically comprise data packets. The input/output 210 may comprise a network card, an 802.3 Ethernet interface, a powerline communication interface, a WiFi transceiver, or the like. In other embodiments, the input/output 210 may comprise a bridging filter for communicating over hybrid networks. A bridging filter comprises a high pass filter configured to separate frequencies at which power is transmitted in a power line from higher frequencies, at which data is transmitted. The separated frequencies including data may then be processed and the data conveyed over an alternative type of communications network. The input/output interface 210 may comprise more than one communication interface to enable communication over more than one type of network. For example, the repeater 110 may be able to receive a data packet via an Ethernet connection and repeat the data packet over a powerline communication network.

The packet registry 220 comprises a database that stores valid copies of data packet characteristics. The valid copies are stored data packet characteristics that are used to determine whether a received data packet has been previously received by the input/output. The packet registry 220 may comprise a volatile memory such as random access memory (RAM), a volatile memory, a read-only memory (ROM), a static memory, and/or the like.

The registry manager 230 maintains the valid copies of the data packet characteristic stored in the packet registry. Various embodiments may use different approaches to maintaining these valid copies. For example, in some embodiments it is assumed that any copy of a characteristic within the packet registry 220 is valid. In these embodiments the registry manager 230 is configured to remove the record after an appropriate delay time. In some embodiments, the registry manager 230 is configured to store characteristics within the packet registry 220 in association with a flag configured to indicate validity of the characteristics. In these embodiments, the registry manager 230 is configured to change the flag to indicate that the characteristic is not longer valid after the delay time. In some embodiments, the registry manager 230 is configured to store characteristics within the packet registry 220 in association with a time value. In these embodiments, the registry manager 230 may be configured to determine the validity of a characteristic by comparing the stored time value with a current time. The time value and the current time are optionally obtained from a timer 250. There are other approaches by which the registry manager 230 may maintain the valid copies of characteristics in the packet registry 220. The registry manager 230 is optionally configured to maintain the valid copies using a first in, first out (FIFO) list.

The timer 250 is configured to determine a time for storage with a characteristic of a data packet, to determine a current time, and/or to determine a relative time. The timer 250 may further be configured for measuring a delay time between when a characteristic is stored in the packet registry 220 and when that characteristic should no longer be considered valid. The delay time may be a predetermined time period. This predetermined time period may be less than or equal to one hundred milliseconds, 150 milliseconds, 200 milliseconds, 300 milliseconds, 500 milliseconds, or one second. In some embodiments, the delay time is selected such that it is less than a retry or retransmission time associated with one or more nodes on the network. Selecting the delay time to be less than the retry or retransmission time means that a valid characteristic of a packet will no longer be stored in the packet registry 220 by the time a retry or retransmission (from the source) of the packet is attempted. A delay time that is less than the retry or retransmission time may help in avoiding dropping legitimate data packets that were resent because the packets were corrupted or not received at a destination node. For example, in some nodes, the retry time is one second or longer.

The delay time may alternatively be dynamic. For example, in some embodiments, the delay time may be set initially to a default time and subsequently adjusted according to network latency or an amount of total traffic on the network. For example, if there is high network latency, the delay time may be increased to compensate for messages taking a longer amount of time to travel within the network. Further, the delay time may decrease if there is a small amount of total network traffic. Other aspects that may be considered in adjusting the delay time include a number of dropped data packets (e.g., packets which have not been repeated), the results of leaky integration or other filter, the number of data packets that have been received, the number of data packets for which a valid characteristic is found, and/or the like. In some embodiments, repeater 110 is configured to test the latency of network 100 by sending out a test data packet and measuring the time before the repeater 110 receives a repeated copy of the test data packet. The delay time may then be set at a value greater than this measured time.

In some embodiments, the registry manager 230 is configured to maintain the packet registry 220 by performing invalidating operations on the packet registry 220 after the delay time has passed. For example, the registry manager 230 may be configured to write the valid copy to the packet registry 220, wait a period of time substantially equal to the delay time, and delete, overwrite and/or otherwise modify the characteristic entry such that a valid copy is no longer present. In these embodiments, no time value need be stored with the valid copy. In other embodiments, a time may be stored along with the copy of the characteristic. The time may correspond to the time at which the copy of the characteristic was stored, or the time at which the copy is to be deleted or otherwise invalidated. The registry manager 230 may compare a current time to the stored time to determine whether to delete characteristic copies, overwrite characteristic copies, and/or modify an entry indicating the validity of the copy. One skilled in the art will realize further methods for maintaining the packet registry 220 using the registry manager 230 after learning of those methods described herein.

The logic 240 is configured to detect a data packet characteristic associated with a received data packet. For example, when a data packet is received by the logic 240, the logic 240 examines that data packet to determine one or more characteristic of the data packet. The characteristic may be a value stored within the data packet, such as a MAC address, or a measured value, such as a measure length of the data packet. The logic 240 is further configured to determine whether a valid copy of the determined data packet characteristic(s) is currently stored in the packet registry 220. If a valid copy of the data packet characteristic is currently stored in the packet registry 220, it is assumed that the data packet was previously received by the repeater 110 within too short a time period, and the repeater 110 does not repeat the data packet. By not resending a data packets that are received more than once within the delay time, the probability of indefinite repetition of a packet or a broadcast storm is significantly reduced.

The logic 240 is configured to repeat the received packet using the input/output 210 if a valid copy of the data packet characteristic is not currently stored in the packet registry 220. This repetition is optionally performed in a broadcast mode. Further, if the logic 240 determines that no valid copy of the data packet characteristic currently exists in the packet registry 220, the logic 240 is configured to establish a valid copy of the characteristic within the packet registry 220. By establishing the valid copy of the characteristic, the data packet will be prevented from being repeated again if the data packet if it is again received by repeater 110 within the delay time.

In some embodiments, the logic 240 is configured to add a tag to the received data packet before repeating the data packet. This tag is optionally added outside the checksum characteristic determined by the repeater 110. In powerline communications networks, the added tag may include a token or parameter indicating the current number of times the packet has been repeated. If this number is beyond a predetermined threshold in the received broadcast packet, the packet is discarded and no longer repeated. If not, the number of repetitions is incremented and the logic 240 broadcasts the received data packet. This method limits the number of times that a data packet can be broadcast by the repeaters 110.

In some embodiments, the logic 240 is configured to detect a broadcast storm if more than a threshold number of data packets are not repeated within a specified period of time because valid matching characteristics were found within the packet registry 220. In the event of a broadcast storm, the logic 240 is optionally configured to stop repeating all data packets for a specified period of time. The logic 240 may further instruct the registry manager 230 to invalidate or clear the contents of the packet registry 220 after this period.

Figure 3:
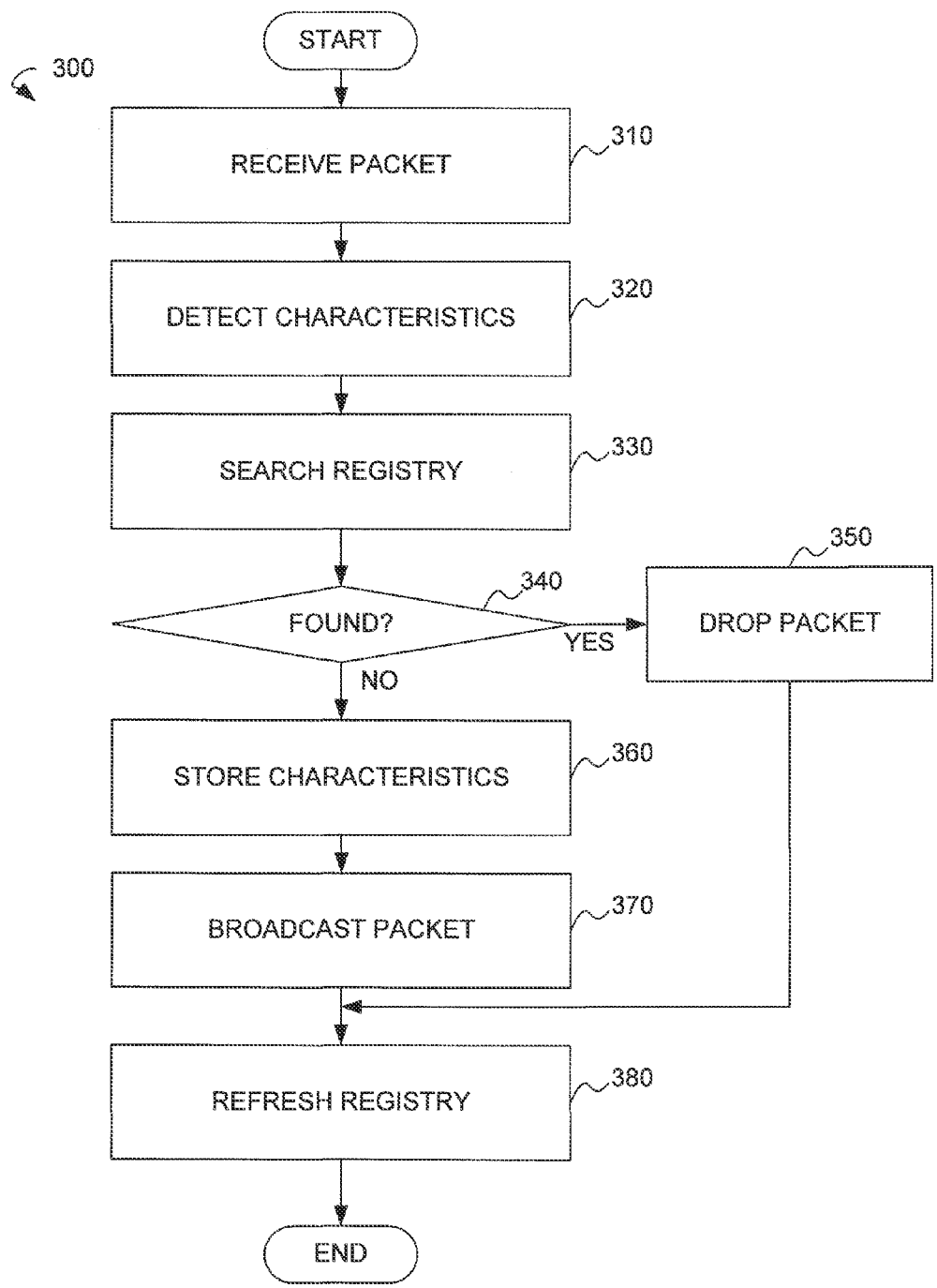
FIG. 3 illustrates various embodiments of a method of repeating a message.

FIG. 3 depicts a flowchart of a process, generally designated 300, for repeating a data packet using a repeater 110 according to various embodiments. The data packet may be part of a message comprising a plurality of data packets. The process 300 may be performed on embodiments of network 100, including a hybrid network, a powerline communications network, an Ethernet, a WiFi network, and/or the like. The process 300 may be used by a repeater 110 to prevent broadcast storms. Process 300 may be used to repeat messages that are unicast, multicast or broadcast.

A step 310 comprises receiving a packet using the input/output 210 of a repeater 110. The packet may be received via a powerline communications network, an Ethernet, or a WiFi network depending on the communication interfaces associated with input/output 210.

A step 320 comprises detecting one or more characteristics associated with the data packet. The characteristics may comprise cyclic redundancy check (CRC) bytes, a checksum, a source MAC address, a packet length, random bytes within the received packet frame, and/or the like.

A step 330 comprises searching the packet registry 220 for the one or more valid copies matching the one or more characteristic associated with the received data packet and detected in step 320. The valid copies typically comprise characteristics associated with data packets that have been received within a delay time.

A step 340 comprises determining whether a valid copy is currently stored in the packet registry 220. If a valid copy is found, the packet is dropped in a step 350 and not repeated. The data packet may be dropped to prevent a broadcast storm from occurring within a loop or mesh in the network 100. In some embodiments, the copy of the one or more characteristic in the packet registry 220 is refreshed after the data packet is dropped. As such, the one or more characteristic will remain valid for at least the delay time after refreshing.

If a valid copy is not found in the packet registry 220 a step 360 is performed. Step 360 includes storing one or more characteristic of the data packet in the packet registry 220.

In a step 370, the data packet is repeated, optionally via a broadcast channel in the network 100. In a step 380, the packet registry 220 is refreshed. Refreshing the packet registry 220 may include updating the validation time associated with the valid copies of a data packet that was dropped in step 350, invalidating data packets that have been valid in the Packet Registry 220 for more than the delay time, eliminating expired or corrupted copies of characteristics, and or the like.

Several embodiments are specifically illustrated and/or described herein. However, it will be appreciated that modifications and variations are covered by the above teachings and within the scope of the appended claims without departing from the spirit and intended scope thereof. For example, in some embodiments, the wireline may comprise a powerline. The systems and methods disclosed herein may additionally implemented in a mesh network where the network topology is known and the topology may be further used to direct a data packet through unicast channels to a destination. Examples discussed herein with reference to unicast may also apply to the use of multicast. Logic discussed herein may be embodied in hardware, firmware, and/or software stored in a computer readable medium.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:
1. A repeater comprising:
an input/output interface;
a packet registry storing packet characteristics of data packets received within a delay time, wherein the delay time represents a threshold amount of elapsed time;

logic configured to
    receive data packets from the input/output interface;
    select particular data packets from among data packets determined not to be copies of previously received data packets, wherein the copies of previously received data packets are received within a predetermined time measured from a time of receipt of the previously received data packet has elapsed;
    repeat the particular data packets; and
    refresh the packet registry, wherein refreshing the packet registry includes removing packet characteristics of data packets received outside the delay time.

2. The repeater of claim 1, wherein the logic is configured to operate in a broadcast mode.

3. The repeater of claim 1, wherein the logic is further configured to determine whether a received data packet is a copy of a previously received data packet based on comparing a characteristic of the received data packet to a characteristic stored in the packet registry.

4. The repeater of claim 3, wherein the characteristic of the received data packet comprises a source identifier.

5. The repeater of claim 3, wherein the characteristic of the received data packet comprises a tag added by logic associated with a network device other than the repeater.

6. The repeater of claim 1, wherein the predetermined time is set based on a rebroadcast interval.

7. The repeater of claim 1, further comprising:
    the packet registry configured to store data packet characteristics of the previously received data packets; and
    a registry manager configured to remove the data packet characteristics from the packet registry after the predetermined time.

8. The repeater of claim 1, wherein the logic is configured to select the particular data packets based upon a search of the packet registry for valid data packet characteristics.

9. The repeater of claim 8, further comprising:
    a registry manager configured to determine a validity status of the data packet characteristics stored in the packet registry.

10. A repeater comprising:
    a packet registry configured to store a valid characteristic of a previously received data packet, at least until a predetermined delay expires;
    an input/output configured to receive a current data packet;
    logic configured to:
        detect a characteristic of the current data packet,
        drop the current data packet if the characteristic of the current data packet corresponds to the valid characteristic stored in the packet registry; and
        refresh the packet registry, wherein refreshing the packet registry includes removing packet characteristics of data packets after the packet characteristics become invalid due to expiration of the predetermined delay.

11. The repeater of claim 10, wherein the logic is configured to operate in a broadcast mode.

12. The repeater of claim 10, further comprising:
    a registry manager configured to determine a validity status of data packet characteristics stored in the packet registry.

13. The repeater of claim 12, further comprising:
    the registry manager configured to remove invalid data packet characteristics from the packet registry.

14. The repeater of claim 12, further comprising:
    the registry manager configured to associate validity indications with respective data packet characteristics stored in the packet registry.

15. The repeater of claim 10, wherein the predetermined delay is selected to be less than a retransmission time associated with one or more nodes on a network.

16. A method comprising:
    storing a first characteristic of a first data packet in a packet registry, the first data packet received at a first time from a first communication network;
    repeating the first data packet over a second communication network;
    receiving a second data packet from the first communication network within a delay time after the first data packet was received, the second packet having a second characteristic matching the first characteristic;
    dropping the second data packet in response to a search of the packet registry finding the second characteristic in the packet registry;
    receiving a third data packet from the first communication network within the delay time after the first data packet was received, the third data packet having a third characteristic different from the first characteristic;
    repeating the third data packet over the second communication network in response to a search of the packet registry indicating that the third characteristic is absent from the packet registry; and
    refreshing the packet registry to remove the first characteristic of the first data packet from the registry after the delay time.

17. The method of claim 16, further comprising:
    receiving a fourth data packet from the first communication network outside of the delay time after the first data packet was received, the fourth data packet having a fourth characteristic different from the first characteristic; and
    dropping the fourth packet.

18. The method of claim 16, further comprising;
    removing the first characteristic from storage in response to determining that the first characteristic is invalid.

19. The method of claim 16, further comprising:
    dynamically adjusting the delay time.

20. The method of claim 19, further comprising:
    dynamically adjusting the delay time based on at least one of: network latency, a number of dropped packets, and a volume of network traffic.

* * * * *